United States Patent [19]

Lauronen

[11] Patent Number: 5,255,754
[45] Date of Patent: Oct. 26, 1993

[54] AXLE CONSTRUCTION FOR A COMMERCIAL VEHICLE

[75] Inventor: Joel Lauronen, Helsinki, Finland
[73] Assignee: Oy Sisu-Auto AB, Karjaa, Finland
[21] Appl. No.: 927,654
[22] PCT Filed: Mar. 11, 1991
[86] PCT No.: PCT/FI90/00070
  § 371 Date: Sep. 1, 1992
  § 102(e) Date: Sep. 1, 1992
[87] PCT Pub. No.: WO91/14587
  PCT Pub. Date: Oct. 3, 1991
[51] Int. Cl.5 .................. B60G 9/00; B60G 11/10; B62D 13/00
[52] U.S. Cl. .................. 180/24.01; 280/81.6; 280/682
[58] Field of Search ............... 280/682, 676, 686, 718, 280/81.6; 180/24.01

[56] References Cited
U.S. PATENT DOCUMENTS 915,733   3/1909  Brillie ................. 180/24.01
2,089,607 8/1937  Hill ................... 280/718
2,788,224 4/1957  Ramun ................. 280/718

FOREIGN PATENT DOCUMENTS 0045411  2/1982  European Pat. Off. .
0082426  6/1983  European Pat. Off. .
2147696  3/1973  Fed. Rep. of Germany .
2902728  8/1980  Fed. Rep. of Germany ..... 280/81.6
699566   2/1931  France ................ 180/24.01

Primary Examiner—Karin L. Tyson
Attorney, Agent, or Firm—Ladas & Parry

[57] ABSTRACT

An axle or boggie construction for a commercial vehicle has a triangular support (4) and an axle (1) made turnable by means of positionally adjustable longitudinal supports (16, 17). To stabilize the operation of the turninq axle (1), the springs (5, 6) of the axle are secured to a chassis frame (22) of the vehicle each with two substantially downwardly directed suspension rods (7, 10) positioned on the front and rear side of the axle (1), respectively, the suspension rods (7, 10) being at one end attached by a joint to the springs and at the other end to the vehicle frame.

3 Claims, 4 Drawing Sheets

AXLE CONSTRUCTION FOR A COMMERCIAL VEHICLE

The invention relates to axle and boggie constructions for a commercial vehicle, especially for a lorry.

Steering twin wheel axles are used with especially heavy transports, in which it is necessary that one or some of the axles provided with twin wheels are steerable, as there are typically more than two such axles and as the turning radius of the lorry is inadequate without steering. Twin wheels in turn are used because of the heavy load. It is also important that the load is distributed evenly on all axles in uneven terrain.

It is customary to use twin wheels supported by separate springs, in which case the construction meets both the turning and load distribution requirements.

It is also possible to use axles journalled fixedly to the frame by means of a turntable. The turning requirements are thereby met, whereas the load distribution requirements will not be fulfilled in cases where there are several axles, as the support springs of the axles used in connection with the turntable are not interconnected.

Moreover, various load distribution arrangements comprising a number of trailers are known. A problem therewith is the poor manageability.

It is also known to use twin wheels each supported by separate springs and each having a separate turntable and wheels that turn easily even through 180°. In this case, however, the wheels cannot be driven mechanically, wherefore hydraulic motors are used in most cases. This arrangement is both complicated and expensive.

In addition, DE Offenlegungsschrift 2 147 696 discloses an axle construction suitable for a commercial vehicle in which the axle is arranged to be turned by affecting the position of the longitudinal supports of the axle. This prior art construction, however, does not solve the problems associated with the control of the turning behaviour of the axle and the interaction between successive axles in boggie constructions comprising several axles.

The object of the present invention is to solve the problems mentioned above in such a way that the requirements concerning the controllability of the turning of the axle and the load distribution will be met. This object is achieved by means of the axle constructions of the invention, which are characterized by at least one spring mounted axle with wheels, triangular and longitudinal supports and rod-secured pivoting means.

This way of supporting the springs has a stabilizing effect on the steering. If the axle is turned, the suspension rods are shifted from their vertical position and the chassis frame of the vehicle rises. An aligning moment thereby acts on the axle, tending to turn the axle into the straight position. The use of steering longitudinal supports enables sufficient turning, so that a normal stiff axle or even a driving axle can be used as a turning axle.

In the case of two or more successive axles, the distribution of load between the axles is accomplished, irrespective of the position of the turning axle, by interconnecting the springs of the axles by means of equalizer levers.

With two or more successive axles, it is to be preferred that the successive axles are both supported by a triangular support and longitudinal supports, irrespective of whether the longitudinal supports are attached directly to the chassis frame or not, because the axles are thereby not able to pivot, so that the load will not be shifted from one axle to another if a change in the force acting between the wheel and the ground tends to create such a shift.

In a steering drive boggie the drive of the turning axle can also be realized traditionally mechanically and by means of a cardan shaft, which is a preferred solution.

The steering of the steering axle may form part of the normal steering mechanism of the vehicle, being operably connected thereto, or the steering axle can be steered separately. The steering mechanism itself may, of course, be power assisted, as is often the case, and it may comprise one or more circuits.

There are many alternative ways of supporting the axle, and it is possible to use all combinations achieved by fixing the forwardly or backwardly directed triangular support above the axle and the forwardly or backwardly directed longitudinal supports below the axle, or by fixing the triangular support below the axle and the longitudinal supports above the axle, directed similarly forwardly or backwardly as above.

The boggie may comprise, and it normally does, more than two axles, and some of the axles may be dead, i.e. not steering. In general, at least one axle is a dead axle. At least the following alternatives are obvious:

A boggie formed by one steering axle and one dead axle. An equalizer lever is used and the spring of the dead axle is secured at one end to the equalizer lever by means of a suspension rod, its other end being secured to the chassis frame similarly or in some other way.

A boggie formed by two steering axles and one dead axle. In this case, the dead axle may be positioned at either end of the boggie, whereby the situation is the same as above except that the equalizer lever is used between the steering axles. Alternatively, the dead axle may be positioned as the middle axle of the boggie, whereby it is sprung to both steering axles by means of equalizer levers.

A boggie formed by three steering axles and one dead axle.

A boggie formed by one steering axle and two dead axles.

A boggie formed by two steering axles and two dead axles.

A boggie formed by three steering axles and two dead axles.

A single steering axle, whereby the equalizer lever is omitted and the suspension rods are secured at the lower end to the points of attachment of the chassis frame. This alternative is not a boggie construction even though the axle support and control of the invention are utilized.

It is to be understood that other alternatives can be realized by means of the boggie arrangement of the invention as well.

In the following the invention will be described in greater detail by means of two specific embodiments with reference to the attached drawings, where FIG. 1 is a side view of the boggie construction of the invention;

Figure 1:
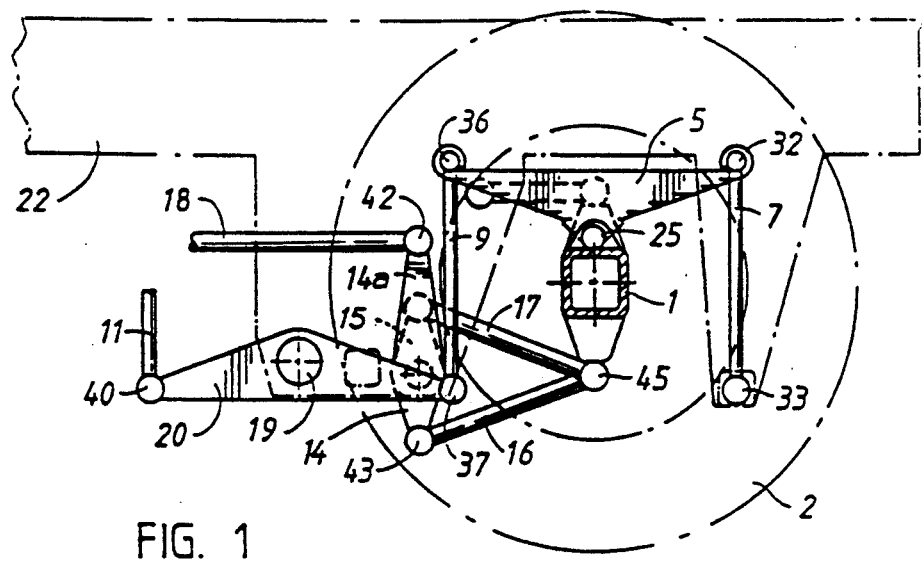
Figure 2:
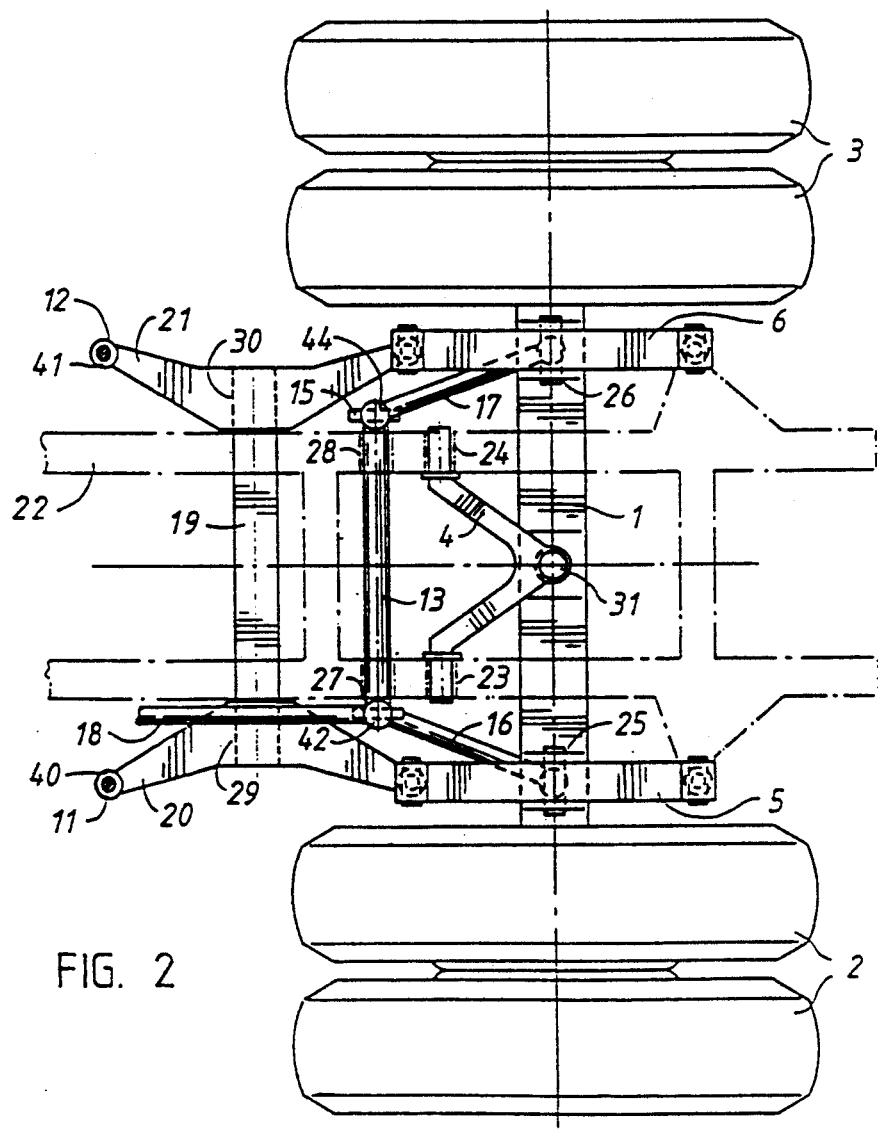
FIG. 2 is a top view of the construction of FIG. 1.

In the figures, the reference numeral 1 indicates an axle beam which may be a drive axle or an axle which is load-bearing only.

The reference numerals 2 and 3 indicate wheels which are usually twin wheels with heavily loaded axles.

A triangular support 4 is attached resiliently to a chassis frame 22 of a vehicle or mounted therein by means of joints 23 and 24. It is also attached centrally to the upper side of the axle beam 1 by means of a ball joint 31. This way of support allows the axle 1 to move resiliently in the vertical direction or to pivot in the vertical plane, in addition to which it allows a steering pivoting movement in the horizontal plane, whereas it prevents the movement of the axle sidewardly of the vehicle.

Longitudinal supports 16 and 17 are attached by means of ball joints 45 and 46, respectively, to the lower side of the axle beam 1 symmetrically on the left and right side as seen from the top. The other ends of the longitudinal supports are attached to steering arms 14 and 15, respectively, by means of ball joints 43 and 44 which are attached to a steering axle 13. The steering axle 13 is mounted to the chassis frame by means of joints 27 and 28. The ball joints 43 and 44 positioned on opposite sides of the chassis frame 22 are thus positioned on opposite sides of the central axis of the steering axle 13 at a distance from the central axis.

The longitudinal supports 16 and 17 together with the triangular support 4 prevent the pivoting of the axle beam 1 as a result of a moment acting on the wheels 2 and 3. They also prevent the changing of the steering pivoting movement when the steering arms 14 and 15 are in position.

The longitudinal support 16 is attached to the steering arm 14 in such a way that the point of attachment is positioned below the steering axle 13 in a position for driving straight ahead. The longitudinal support 17 is attached to the steering arm 15 in such a way that the point of attachment is positioned above the steering axle 13 in the position for driving straight ahead.

The steering axle 13 and the steering arms 14 and 15 attached to it can be turned by means of an intermediate steering rod 18 attached by means of a ball joint 42 to an extension 14a extending upwardly from the steering arm 14 and having a clearly greater length than the steering arm 14.

When the steering axle 13 is turned by means of the steering arm 14 in such a way that the ball joint 42 approaches the axle beam 1, that is, clockwise in FIG. 1, the point of attachment 43 of the steering longitudinal support 16 on the steering arm 14 is shifted along a circular path from the upper dead centre towards the nominal position of the axle beam 1, thus forcing also the point of attachment 45 of the longitudinal support 16 on the axle beam 1 to shift backwards. Correspondingly, the point of attachment 44 of the other steering longitudinal support 17 on the steering arm 15 is shifted along a circular path from the lower dead centre away from the nominal position of the axle beam 1, forcing the point of attachment 46 of the longitudinal support 17 on the axle beam 1 to shift forwards. Since the points of the upper triangular support 4 remain in position, the axle turns. When the steering axle 13 is turned in opposite direction (FIG. 3), the axle 1 also turns in opposite direction.

The steering of the steering axle 1 may form part of the normal steering mechanism of the vehicle, being operably connected to it, or it can be steered separately.

The steering mechanism itself may, of course, be power assisted, as is often the case, and it may comprise one or more circuits.

The use of steering support rods enables sufficient turning, whereby a normal stiff axle or even a drive axle can be used as a turning axle.

Springs 5 and 6 are attached centrally to the axle beam by means of joints 25 and 26 and at the ends to the upper end of suspension rods 7 and 9 and 8 and 10, respectively, by means of a ball joint 32 and 36, and 34 and 38. The suspension rods 7 and 8 attached at the lower end to the chassis frame 22 by means of ball joints 33 and 35 and the suspension rods 9 and 10 to the end of equalizer levers 21 and 21 by means of ball joints 37 and 39.

Figure 3:
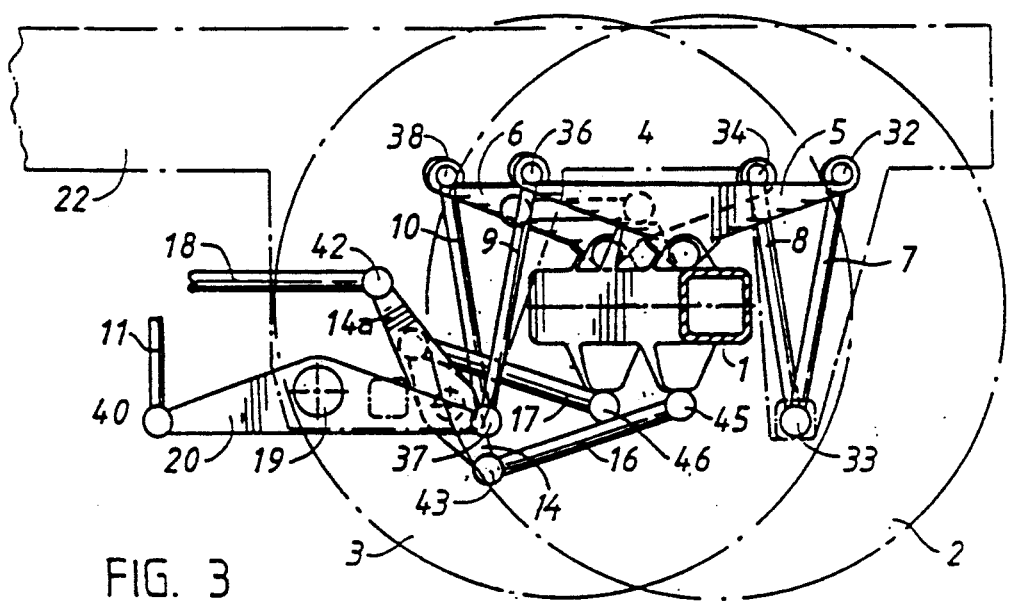
FIG. 3 is a side view of the construction of FIGS. 1 and 2 when the axle is in a turned position.
Figure 4:
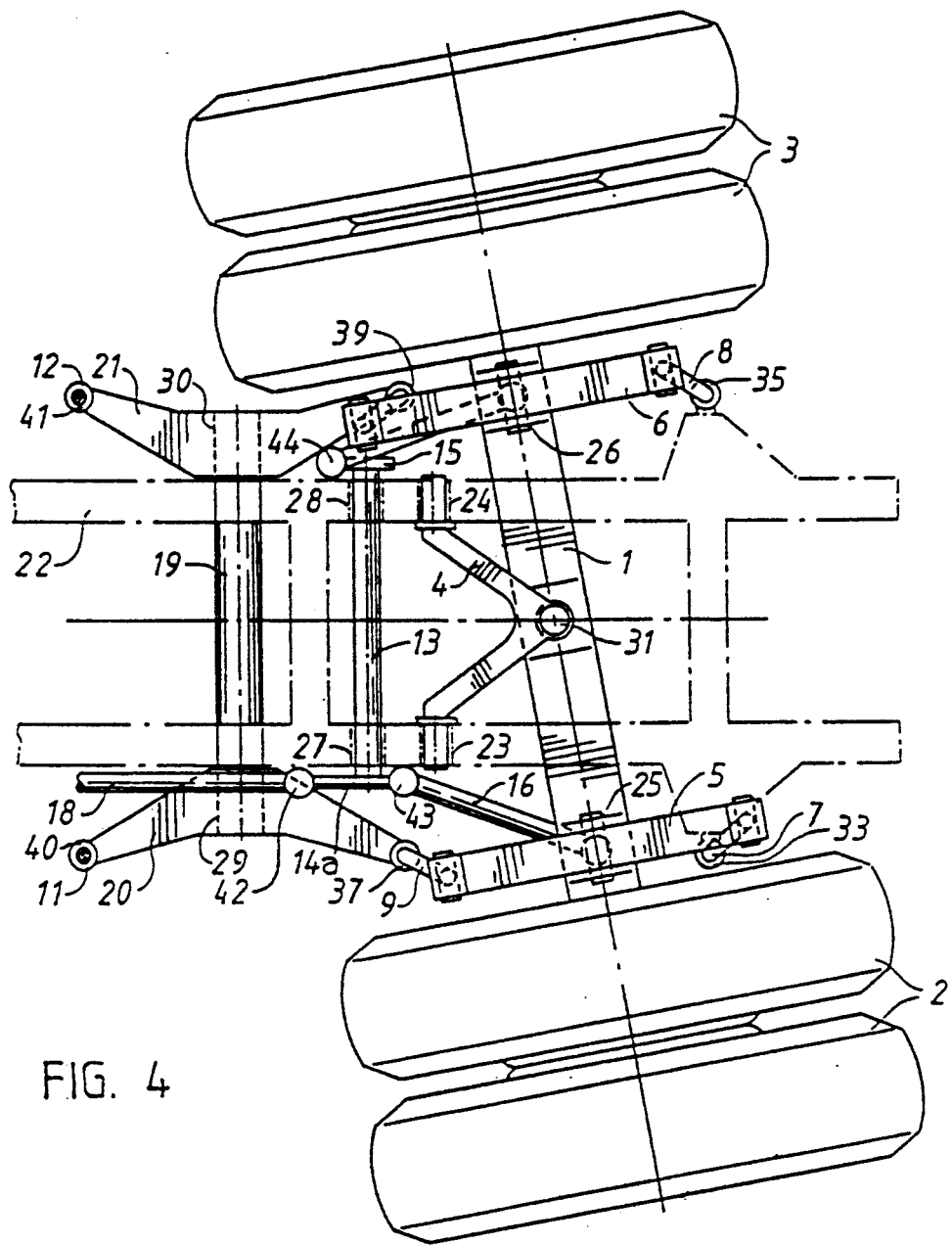
FIG. 4 is a top view of FIG. 3.

During the turning, the suspension rods 7, 8, 9 and 10 are pivoted away from their vertical position, as shown in FIGS. 3 and 4, so that the chassis frame 22 of the vehicle rises. The tendency of the rods 7, 8, 9 and 10 to return to the vertical position due to the weight of the vehicle causes the steering to be subjected to a moment which tends to return it to the position for driving straight ahead, which has a stabilizing effect on the steering.

The equalizer levers 20 and 21 are mounted by means of joints 29 and 30, respectively, centrally to an equalizer lever axle 19 which is attached to the chassis frame 22.

The other end of the equalizer levers 20 and 21 is connected to the springs of another axle by means of ball joints 40 and 41 and suspension rods 11 and 12, which other axle may be steering or non-steering. In addition, either, neither or both of the axles of the boggie may be driving, whereby the rest are merely such load-bearing axles as shown in the figures.

The equalizer levers preferably distribute wheel loads between the axles interconnected by means of them. In cases where both boggie axles are driving, it is possible in the construction of the invention that the drive of the backward steering drive axle is preferably effected through a cardan shaft connected between the axles.

Figure 5:
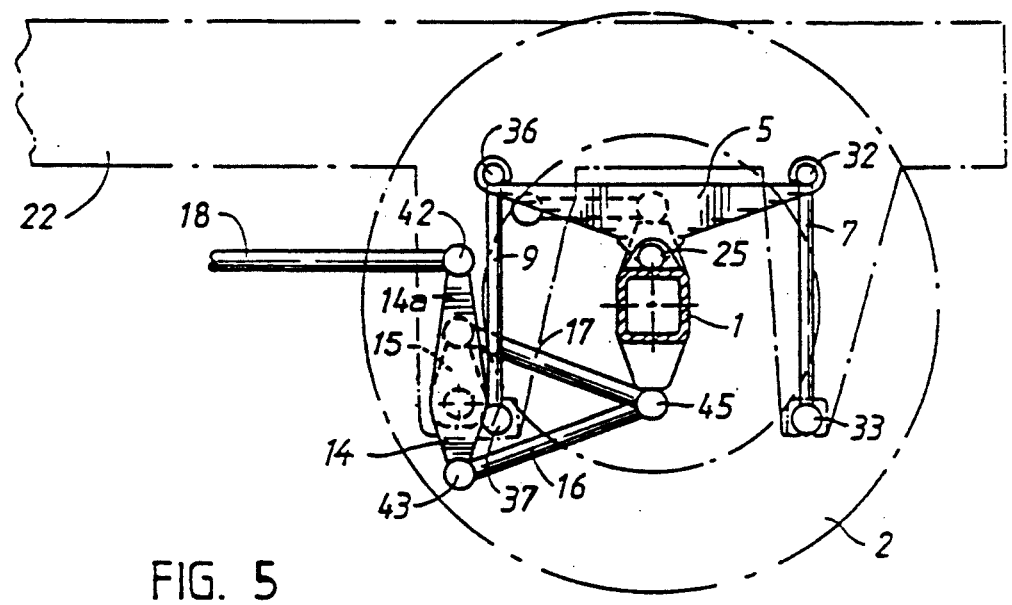
FIG. 5 illustrates a single-axle construction according to the invention similarly as in FIG. 1.

In a construction comprising a single axle (FIG. 5), which is steering, the equalizer levers are omitted and the suspension rods 9 and 10 are attached to the chassis frame 22 similarly as the suspension rods 7 and 8.

The arrangement of the invention has been described above by means of two specific arrangements and it is to be understood that the invention can be modified widely without deviating from the scope of protection defined in the attached claims, and it can be applied in various axle constructions, of which only a few possible examples have been mentioned.

The support of the axle can be realized in many alternative ways, and it is possible to use all combinations achieved by fixing the forwardly or backwardly directed triangular support 4 above the axle beam 1, and the steering forwardly or backwardly directed longitudinal supports 16 and 17 below the axle 1, or by fixing the triangular support 4 below the axle beam 1 and the longitudinal supports 16 and 17 above the axle, directed similarly forwardly or backwardly as above.

I claim:

1. An axle constructed for a commercial vehicle, comprising:
   an axle (1);
   wheels (2, 3) mounted in bearings at ends of the axle;

springs (5, 6) provided at both ends of the axle between the axle and a chassis frame (22) of the vehicle;

a triangular support (4) attached at one point by means of a joint centrally to the axle and journalled at two points to the chassis frame on its opposite sides;

longitudinal supports (16, 17) positioned on opposite sides of the chassis frame and each having one end attached by a joint to the axle (1) near the ends of the axle on an opposite side of a central axis of the axle relative to the point of the attachment (31) of the triangular support, and the other end attached by a joint to a steering axle (13) journalled to the chassis frame and fitted between the ends of the longitudinal supports (16, 17) eccentrically so that the points of attachment (43, 44) of the longitudinal supports on opposite sides of the chassis frame on the steering axle are positioned on opposite sides of the central axis of the steering axle at a distance from the central axis; and means (14a, 42, 18) attached to the steering axle (13) for pivoting it, the axle (1) being arranged to be turned by pushing and pulling movements to the longitudinal supports (16, 17) attached to the steering axle, characterized in that each spring (5, 6) is secured to the chassis frame (22) by means of two substantially downwardly directed suspension rods (7-10) positioned on the front and rear sides of the axle, respectively, the suspension rods (7-10) being at one end attached to the chassis frame and at the other end to the springs.

2. A boggie construction for a commercial vehicle, comprising:

at least two stiff axles (1);
wheels (2, 3) attached to the ends of each axle; and
springs (5, 6) provided at both ends of each axle between the axles and a chassis frame (22) of the vehicle,
wherein at least one of the stiff axles comprises:

a triangular support (4) attached by a joint at one point centrally to the axle and journalled at two points to the chassis frame on its opposite sides;

longitudinal supports (16, 17) positioned on opposite sides of the chassis frame and each having one end attached by a joint to the axle (1) near the ends of the axle and on an opposite side of a central axis of the axle relative to the point of the attachment (31) of the triangular support, and the other end attached by a joint to a steering axle (13) journalled to the chassis frame (22) and fitted between the ends of the longitudinal supports (16, 17) eccentrically so that the points on opposite sides of the chassis frame on the steering axle are positioned on opposite sides of the central axis of the steering axle at a distance from the central axis; and means (14a, 42, 18) attached to the steering axle (13) for pivoting it, the axle (1) being arranged to be turned by pushing and pulling movements of the longitudinal supports (16, 17) attached to the steering axle, characterized in that:

the springs (5, 6) of each turnable axle (1) are secured to the chassis frame (22), each spring being secured by means of two substantially downwardly directed suspension rods (7-10) positioned on the front and rear sides of the axle (1), respectively, one of the two suspension rods (7-10) being at one end attached by a joint to the spring and at the other end to the chassis frame, the other of the two suspension rods being at one end attached by a joint to the spring and at the other end to an equalizer lever (20, 21) which is journalled to the chassis frame on a side thereof and by means of which the springs of the axles are interconnected; and the springs (5, 6) of each turnable axle are secured to the axle by means of joints (25, 26).

3. A boggie construction according to claim 2, characterized in that each axle comprises a joint provided between the axle and the spring.

* * * * *

UNITED STATES PATENT AND TRADEMARK OFFICE
CERTIFICATE OF CORRECTION

PATENT NO.  : 5,255,754
DATED       : OCTOBER 26, 1993
INVENTOR(S) : Joel LAURONEN It is certified that error appears in the above-identified patent and that said Letters Patent is hereby corrected as shown below:

On title page, left column, item [86], change "PCT/FI90/00070" to -- PCT/FI91/00070--.

On title page, left column, add -- [30] Foreign Application Priority Date March 26, 1990 [FI] Finland...901498--.

Signed and Sealed this

Second Day of August, 1994

BRUCE LEHMAN

Attest:

Attesting Officer

Commissioner of Patents and Trademarks